US012786537B2

(12) United States Patent
Gao et al.

(10) Patent No.: US 12,786,537 B2
(45) Date of Patent: Nov. 3, 2026

(54) DISPLAY DEVICE

(71) Applicants: Chengdu BOE Optoelectronics Technology Co., Ltd., Chengdu (CN); BOE Technology Group Co., Ltd., Beijing (CN)

(72) Inventors: Wanxu Gao, Beijing (CN); Liqiang Chen, Beijing (CN); Jiafan Shi, Beijing (CN); Chao Yang, Beijing (CN); Yangjie Wan, Beijing (CN); Xin Zhang, Beijing (CN); Junshan Li, Beijing (CN); Wenliang Liu, Beijing (CN); Mengyuan Pang, Beijing (CN); Chuandong Liao, Beijing (CN); Yang Yang, Beijing (CN)

(73) Assignees: CHENGDU BOE OPTOELECTRONICS TECHNOLOGY CO., LTD., Chengdu (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 215 days.

(21) Appl. No.: 18/577,655

(22) PCT Filed: Apr. 28, 2023

(86) PCT No.: PCT/CN2023/091713
§ 371 (c)(1),
(2) Date: Jan. 8, 2024

(87) PCT Pub. No.: WO2023/231678
PCT Pub. Date: Dec. 7, 2023

(65) Prior Publication Data

US 2024/0268540 A1 Aug. 15, 2024

(30) Foreign Application Priority Data

May 31, 2022 (CN) ......................... 202210610094.9

(51) Int. Cl.
*H04N 23/53* (2023.01)
*A45D 40/22* (2006.01)
(Continued)

(52) U.S. Cl.
CPC ......... *H04N 23/531* (2023.01); *A45D 40/221* (2013.01); *A45D 42/02* (2013.01); *G06F 1/1616* (2013.01)

(58) Field of Classification Search
None
See application file for complete search history.

(56) References Cited

U.S. PATENT DOCUMENTS

2012/0279516 A1* 11/2012 Bouix .................. A45D 40/265 132/301
2012/0305442 A1 12/2012 Apodaca et al.
(Continued)

FOREIGN PATENT DOCUMENTS

CN 1448087 A 10/2003
CN 102138726 A 8/2011
(Continued)

OTHER PUBLICATIONS

CN 202210610094.9 first office action dated May 28, 2025.
CN202221345049.7 first office action dated Aug. 17, 2022.

*Primary Examiner* — Paul M Berardesca
(74) *Attorney, Agent, or Firm* — IPro, PLLC

(57) ABSTRACT

Provided is a display device. The display device includes: a box cover, a box base, and a mirror display panel, wherein the box cover is connected to the box base, and the mirror display panel is connected to the box cover; the box cover is configured to have an open state and a closed state; wherein in a case that the box cover is in the open state, the box cover is at least partially separated from the box base, such that the mirror display panel is disposed outside the box
(Continued)

base; and in a case that the box cover is in the closed state, the mirror display panel is disposed inside the box base.

17 Claims, 11 Drawing Sheets

(51) Int. Cl.
*A45D 42/02* (2006.01)
*G06F 1/16* (2006.01)

(56) References Cited

U.S. PATENT DOCUMENTS

| | | | | |
|---|---|---|---|---|
| 2015/0094123 | A1* | 4/2015 | Yeiser, IV | A45D 40/24<br>340/636.2 |
| 2016/0331101 | A1* | 11/2016 | Lewis | A45D 33/008 |
| 2017/0244069 | A1* | 8/2017 | Kim | H10K 59/131 |
| 2020/0174530 | A1* | 6/2020 | Wu | G06F 1/1681 |
| 2024/0057375 | A1* | 2/2024 | Tian | H10K 50/854 |
| 2024/0057376 | A1* | 2/2024 | Wang | H10K 50/85 |

FOREIGN PATENT DOCUMENTS

| | | | | |
|---|---|---|---|---|
| CN | 102693288 A | | 9/2012 | |
| CN | 102805471 A | | 12/2012 | |
| CN | 202722915 U | | 2/2013 | |
| CN | 106021704 A | | 10/2016 | |
| CN | 106937791 A | | 7/2017 | |
| CN | 209031383 U | | 6/2019 | |
| CN | 110828695 A | | 2/2020 | |
| CN | 212233502 U | | 12/2020 | |
| CN | 112909208 A | * | 6/2021 | B32B 9/045 |
| CN | 114863824 A | | 8/2022 | |
| CN | 218273839 U | | 1/2023 | |
| EP | 2018817 A1 | | 1/2009 | |
| KR | 100823424 B1 | | 4/2008 | |
| KR | 20210062557 A | | 5/2021 | |
| WO | WO-2019021034 A1 | * | 1/2019 | A45D 44/005 |

* cited by examiner

DISPLAY DEVICE

CROSS-REFERENCE TO RELATED APPLICATIONS

The present disclosure is a U.S. national phase application based on PCT/CN2023/091713, filed on Apr. 28, 2023, which is based on and claims priority to Chinese Patent Application No. 202210610094.9, filed on May 31, 2022 and entitled "DISPLAY DEVICE", all of which are hereby incorporated by reference in their entireties for all purposes.

TECHNICAL FIELD

The present disclosure relates to the field of display technologies, and in particular, relates to a display device.

BACKGROUND

As display technologies develop, functions of a display device have gradually diversified. A mirror display device is a display device that combines a display function with a mirror function. Because the mirror display device can not only display a picture but also serve as a mirror, it is widely used in homes, shopping malls, advertising, and other fields.

SUMMARY

Embodiments of the present disclosure provide a display device. The technical solutions are as follows.

The embodiments of the present disclosure provide a display device. The display device includes: a box cover, a box base, and a mirror display panel, wherein the box cover is connected to the box base, and the mirror display panel is connected to the box cover; the box cover is configured to have an open state and a closed state; wherein in a case that the box cover is in the open state, the box cover is at least partially separated from the box base, such that the mirror display panel is disposed outside the box base; and in a case that the box cover is in the closed state, the mirror display panel is disposed inside the box base.

In some embodiments, the display device further includes a circuit board and a patch cord, wherein the box base is provided with an accommodating cavity, the circuit board is disposed in the accommodating cavity, and the circuit board and the mirror display panel are connected by the patch cord.

In some embodiments, the box base further includes a partition plate, wherein the partition plate divides the accommodating cavity into a first cavity and a second cavity, the first cavity being proximal to the box cover and being configured to accommodate an article, and the circuit board being disposed in the second cavity.

In some embodiments, the display device further includes a power supply, wherein the power supply is electrically connected to the circuit board and is disposed in the second cavity; and the box base further includes a heat-insulting plate, wherein the heat-insulting plate is disposed in the second cavity and is disposed between the circuit board and the power supply.

In some embodiments, the box base is provided with a communicating hole, wherein one end of the communicating hole is disposed on a wall of the accommodating cavity, and another end of the communicating hole is disposed at a connection between the box cover and the box base; and a part of the patch cord is disposed in the communicating hole, and another part of the patch cord is disposed in the box cover.

In some embodiments, a surface of the box cover facing the box base is provided with an embedding groove, and the mirror display panel is disposed in the embedding groove.

In some embodiments, the mirror display panel includes a panel body and a driving integrated circuit, wherein the panel body is electrically connected to the driving integrated circuit; and a mounting table is provided in the mounting groove, a part of the panel body is disposed on the mounting table, another part of the panel body, the mounting table, and a bottom of the mounting groove are enclosed to form a mounting cavity, and the driving integrated circuit is disposed in the mounting cavity.

In some embodiments, the box cover is provided with a channel, wherein the channel is disposed at a connection between the box cover and the box base, and is communicated with the mounting cavity, and the patch cord is disposed in the channel and is connected to the driving integrated circuit.

In some embodiments, the panel body includes a display substrate and a metal reflecting layer which are sequentially stacked; wherein the display substrate includes a base substrate and a plurality of light-emitting units; the plurality of light-emitting units being arranged on the base substrate in an array; and the metal reflecting layer is provided with a plurality of light-transmitting holes, and each of the light-transmitting holes corresponding to at least one of the light-emitting units.

In some embodiments, the metal reflecting layer includes an aluminum metal layer or a molybdenum metal layer.

In some embodiments, the panel body further includes a selective reflective layer, wherein the selective reflective layer is disposed on a surface of the metal reflecting layer distal from the display substrate and partially disposed in the light-transmitting hole, and the selective reflective layer includes a composite film layer composed of at least two materials which have different refractive indexes.

In some embodiments, the selective reflective layer includes a $SiN_x/SiO_2/SiN_x$ composite film layer.

In some embodiments, the panel body further includes an atomizing layer, wherein the atomizing layer is disposed on a surface of the metal reflecting layer distal from the display substrate.

In some embodiments, the box cover is hinged with the box base, or the box cover is connected to the box base by a flexible member.

In some embodiments, the display device further includes a lock-up member, wherein the lock-up member is disposed on the box base and is configured to lock a relative angle between the box cover and the box base.

In some embodiments, the box cover is hinged with the box base; the box cover is provided with an arc-shaped surface facing the box base, wherein the arc-shaped surface is disposed at a hinge between the box cover and the box base, and is centered around a hinge axis between the box cover and the box base, and is provided with at least two lock-up grooves, the two lock-up grooves being arranged circumferentially at intervals by taking the hinge axis between the box cover and the box base as a center; and the lock-up member includes a wave bead screw, wherein a bead of the wave bead screw facing the arc-shaped surface and abuts against the arc-shaped surface.

In some embodiments, the display device further includes a first locking structure and a second locking structure, wherein the first locking structure is disposed on a surface of the box cover facing the box base, the second locking structure is disposed on a surface of the box base facing the box cover, and in the case that the box cover is in the closed state, the first locking structure and the second locking structure are connected in a lock-up fashion.

In some embodiments, the first locking structure and the second locking structure are both magnetic members; or, one of the first locking structure and the second locking structure is a protrusion, another of the first locking structure and the second locking structure is a recess, the protrusion being detachably connected to the recess.

In some embodiments, the display device is a cosmetic mirror.

In some embodiments, the mirror display panel is configured to display environmental parameters, the environmental parameters including an ultraviolet index and a humidity; or, the mirror display panel is configured to display makeup information in a set region, wherein the makeup information includes a makeup color and a makeup map, and the set region includes at least a part of a region where a human face is imaged on the mirror display panel.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

REFERENCE NUMERALS IN THE FIGURES

Figure 1:
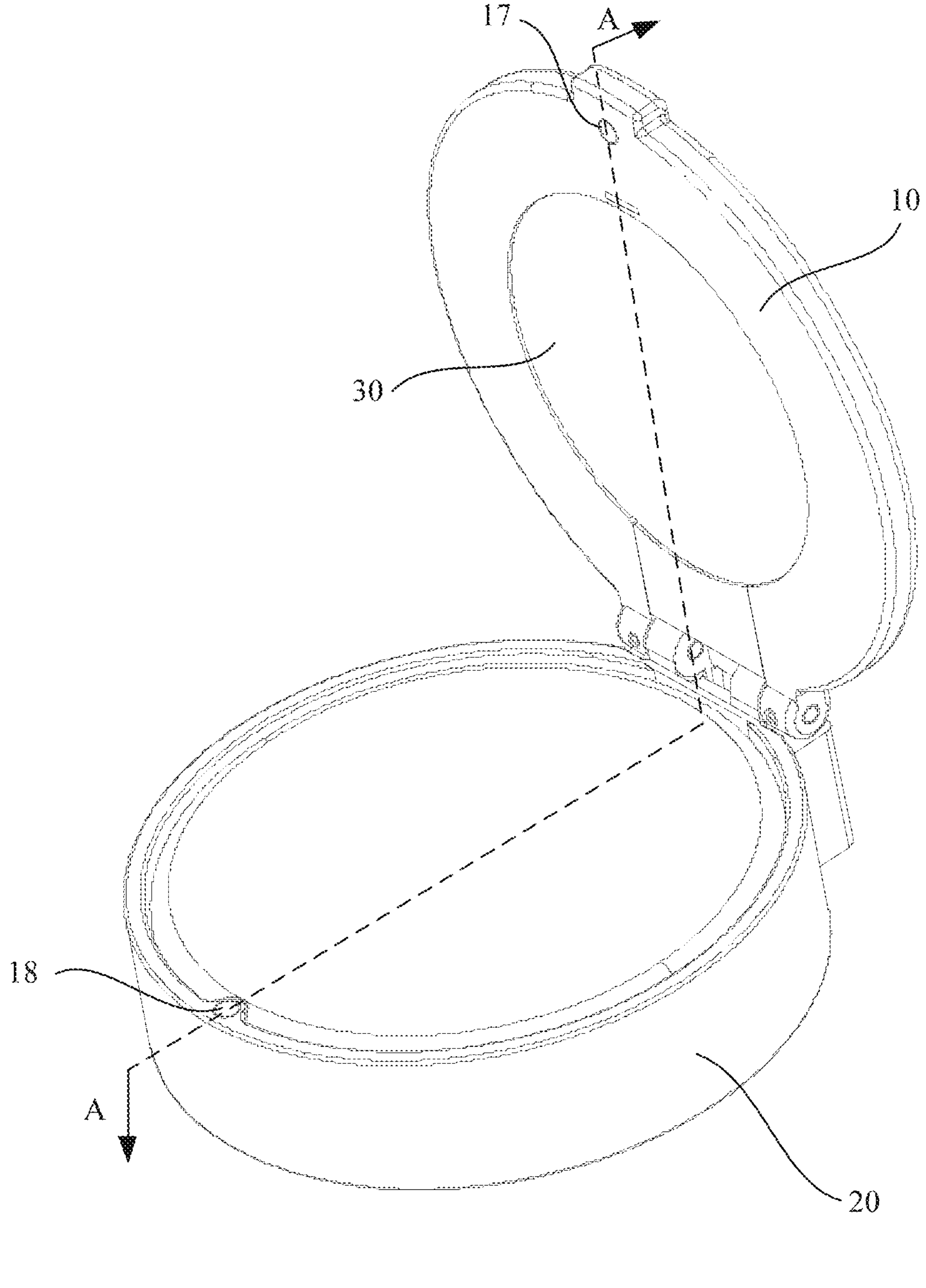
FIG. 1 is a schematic structural diagram of a display device according to some embodiments of the present disclosure.

10, box cover; 11, embedding groove; 12, mounting table; 13, mounting cavity; 14, channel; 15, checking groove; 16, checking plate; 17, first locking structure; 18, second locking structure;

111, first lug plate; 112, second lug plate; 113, first hinge hole; 114, second hinge hole; 115, pin shaft; 116, lock-up groove;

20, box base; 210, accommodating cavity; 211, first cavity; 212, second cavity;

22, communicating hole;

23, partition plate; 231, first through hole;

24, heat-insulting plate; 241, connecting groove; 242, second through hole;

25, supporting column; 251, screw hole;

26, limiting groove; 27, cushion block; 28, third through hole;

30, mirror display panel; 31, panel body; 310, display substrate; 311, metal reflecting layer; 312, base substrate; 313, light-emitting unit; 314, light-transmitting hole; 315, selective reflective layer; 316, atomizing layer; 32, driving integrated circuit;

41, circuit board; 42, power supply; 43, patch cord;

50, wave bead screw; 51, barrel; 52, spring; 53, bead; and

60, pressed powder.

DETAILED DESCRIPTION

For clearer descriptions of the objectives, technical solutions, and advantages of the present disclosure, the embodiments of the present disclosure are described in detail hereinafter with reference to the accompanying drawings.

Unless otherwise defined, the technical terms or scientific terms used in the embodiments of the present disclosure shall be taken to mean the ordinary meanings as understood by the ordinary skill in the art to which the present disclosure belongs. The terms "first," "second," "third," and the like used in the description and claims of the present disclosure do not denote any order, quantity or importance, but are merely used to distinguish different components. Similarly, terms such as "a/an," or "one" do not indicate the quantity limit, but indicate the existence of at least one. The terms "comprise/include" or "contain" and the like are intended to mean that the elements or objects before the terms cover the elements or objects or equivalents listed after the terms, without excluding other elements or objects. The terms "connected," "coupled," and the like are not limited to physical or mechanical connections, and may include electrical connection, and the connection may be direct or indirect. The terms "upper," "lower," "left," "right," "top," "bottom," and the like are only used to indicate the relative positional relations; and after the absolute position of the described object changes, the relative positional relationship may also change accordingly.

In the related art, a display panel in the mirror display device is relatively large in size, such as, a full-length mirror display panel and a half-length mirror display panel. However, it is inconvenient to carry this type of oversize mirror display panel.

The embodiments of the present disclose provides a display device in which a mirror display panel is combined with a box by assembling the mirror display panel and the box, thereby facilitating carrying by a user.

FIG. 1 is a schematic structural diagram of a display device according to some embodiments of the present disclosure. As shown in FIG. 1, the display device includes a box cover 10, a box base 20, and a mirror display panel 30. The box cover 10 is connected to the box base 20, and the mirror display panel 30 is connected to the box cover 10.

In the embodiments of the present disclosure, the box cover 10 is configured to have an open state and a closed state. The box cover 10 shown in FIG. 1 is in the open state. As shown in FIG. 1, in the case that the box cover 10 is in the open state, the box cover 10 is at least partially separated from the box base 20, and the mirror display panel 30 is disposed outside the box base 20.

Figure 2:
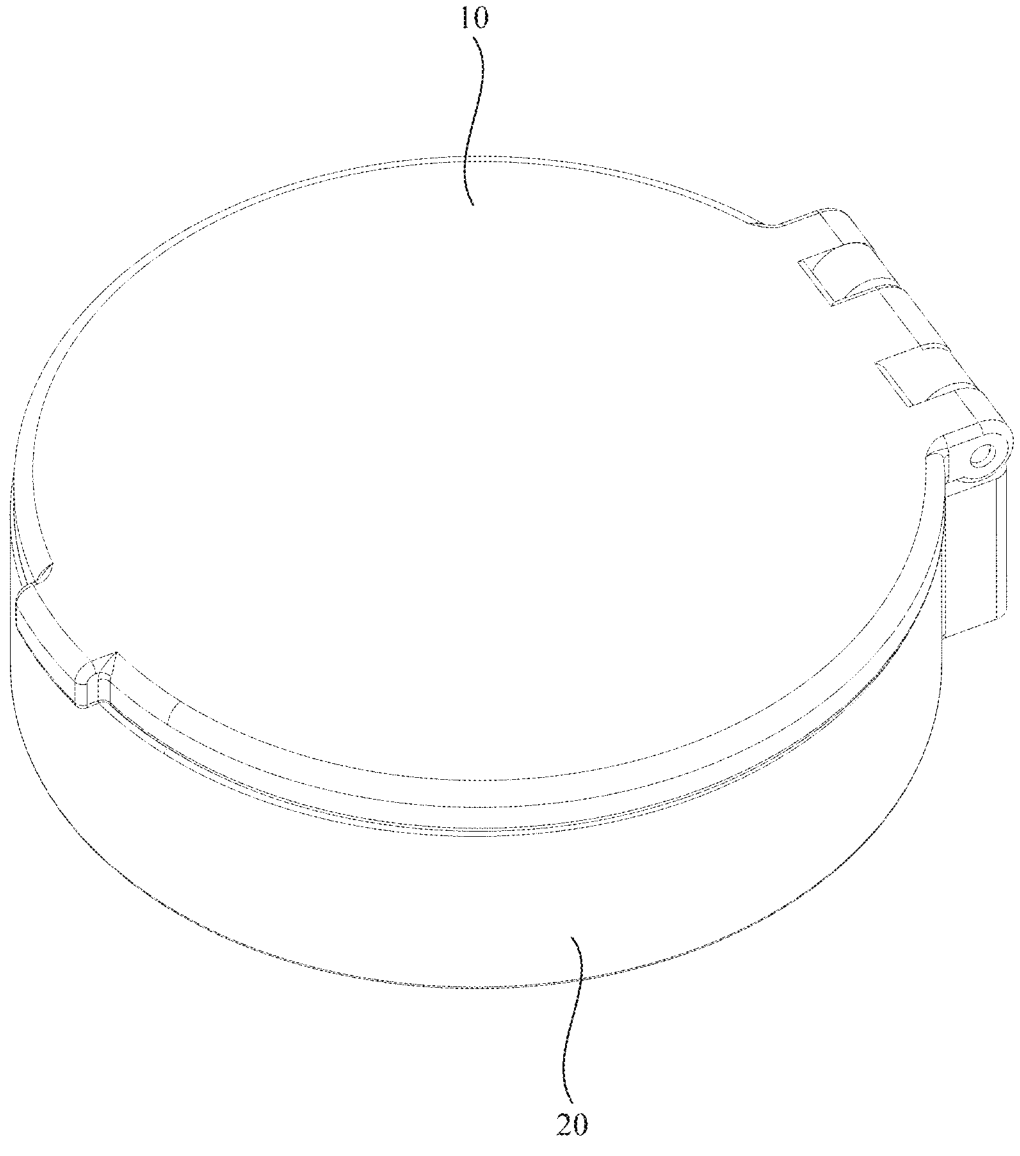
FIG. 2 is a schematic structural diagram of another display device according to some embodiments of the present disclosure.

FIG. 2 is a schematic structural diagram of another display device according to some embodiments of the present disclosure. The box cover 10 shown in FIG. 2 is in the closed state. As shown in FIG. 2, in the case that the box cover 10 is in the closed state, the mirror display panel 30 is disposed inside the box base 20.

The display device provided according to the embodiments of the present disclosure includes the box cover 10, the box base 20, and the mirror display panel 30. The box cover 10 is connected to the box base 20, and the mirror display panel 30 is provided on the box cover 10. After being assembled with the box base 20, the box cover 10 has two states, in which the mirror display panel 30 can be disposed inside the box base 20 and is removed out of the box base 20, respectively. By setting the two states, not only can a use need of exposing the mirror display panel 30 in the case that a user needs to use it be met, but also the mirror display panel 30 can be protected by hiding it in the box base 20.

In addition, by combining the mirror display panel 30 with the box cover 10, the mirror display panel 30 is mounted on a box, such that the size of the mirror display panel 30 can be effectively reduced, thereby facilitating carrying by the user.

Figure 3:
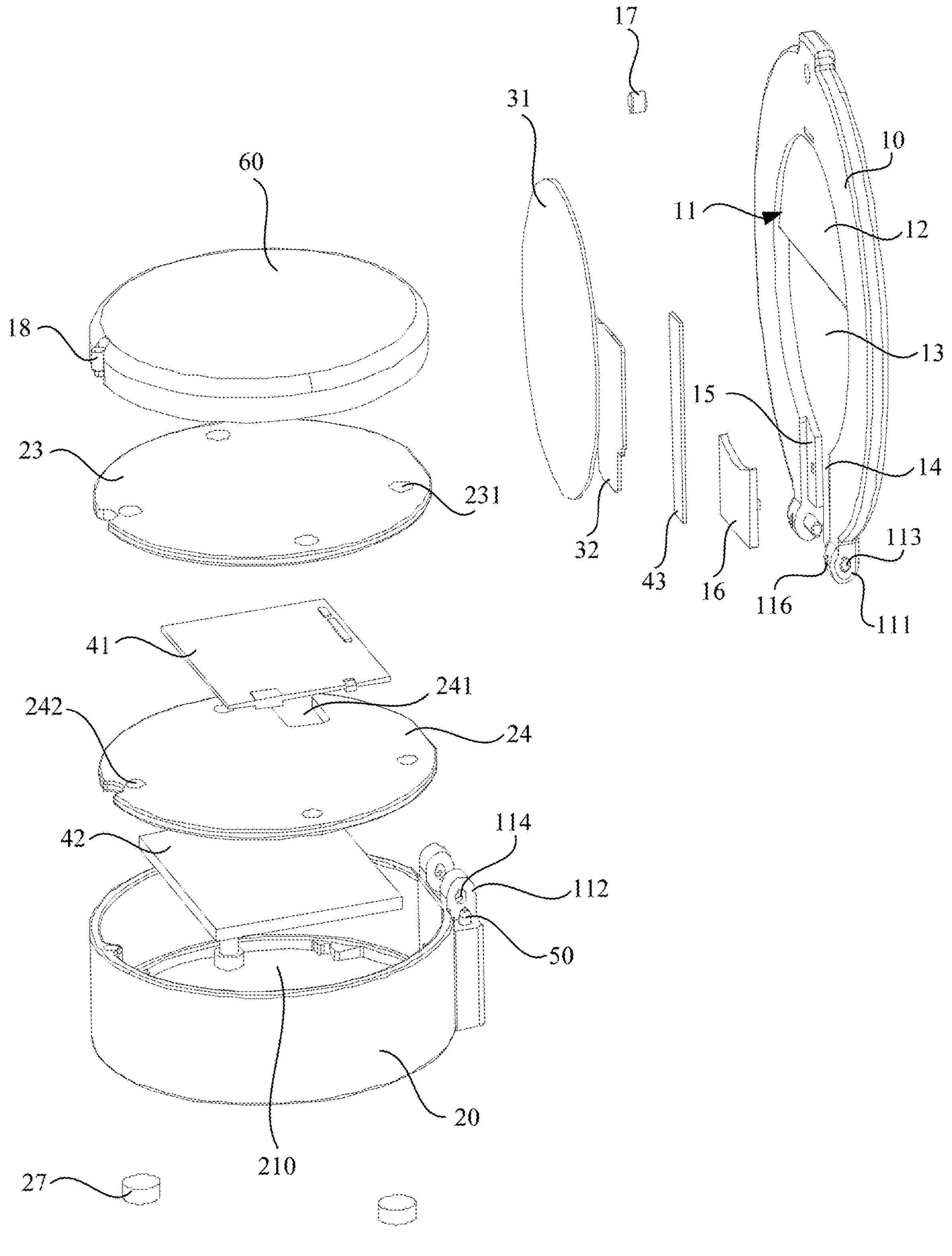
FIG. 3 is an exploded view of a display device according to some embodiments of the present disclosure.

FIG. 3 is an exploded view of a display device according to some embodiments of the present disclosure. As shown in FIG. 3, the display device further includes a circuit board 41 and a patch cord 43. The box base 20 has an accommodating cavity 210, the circuit board 41 is disposed in the accommodating cavity 210, and the circuit board 41 and the mirror display panel 30 are connected by the patch cord 43.

In this way, electronic devices for being connected to the mirror display panel 30 in the display device are separated from the mirror display panel 30, such that the respective electronic devices are separately mounted in the box base 20 or the box cover 10, and the internal space of the box base 20 and the internal space of the box cover 10 can be fully utilized, thereby enabling each electronic device in the display device to be reasonably mounted in the box base 20 and the box cover 10.

In addition, the circuit board 41 is provided in the box base 20; and a part of the patch cord 43 is disposed in the box base 20, and another part of the patch cord 43 is disposed in the box cover 10. In this way, the circuit board 41 is protected from exposing, and most of the patch cord 43 can be hidden, thereby improving the reliability.

Exemplarily, the circuit board 41 may be a printed circuit board (PCB) 41 or a flexible printed circuit board (FPCB) 41. The circuit board 41 is connected to the mirror display panel 30, and the circuit board 41 may control the mirror display panel 30 to display an image, such that the mirror display panel 30 has a display function.

Figure 4:
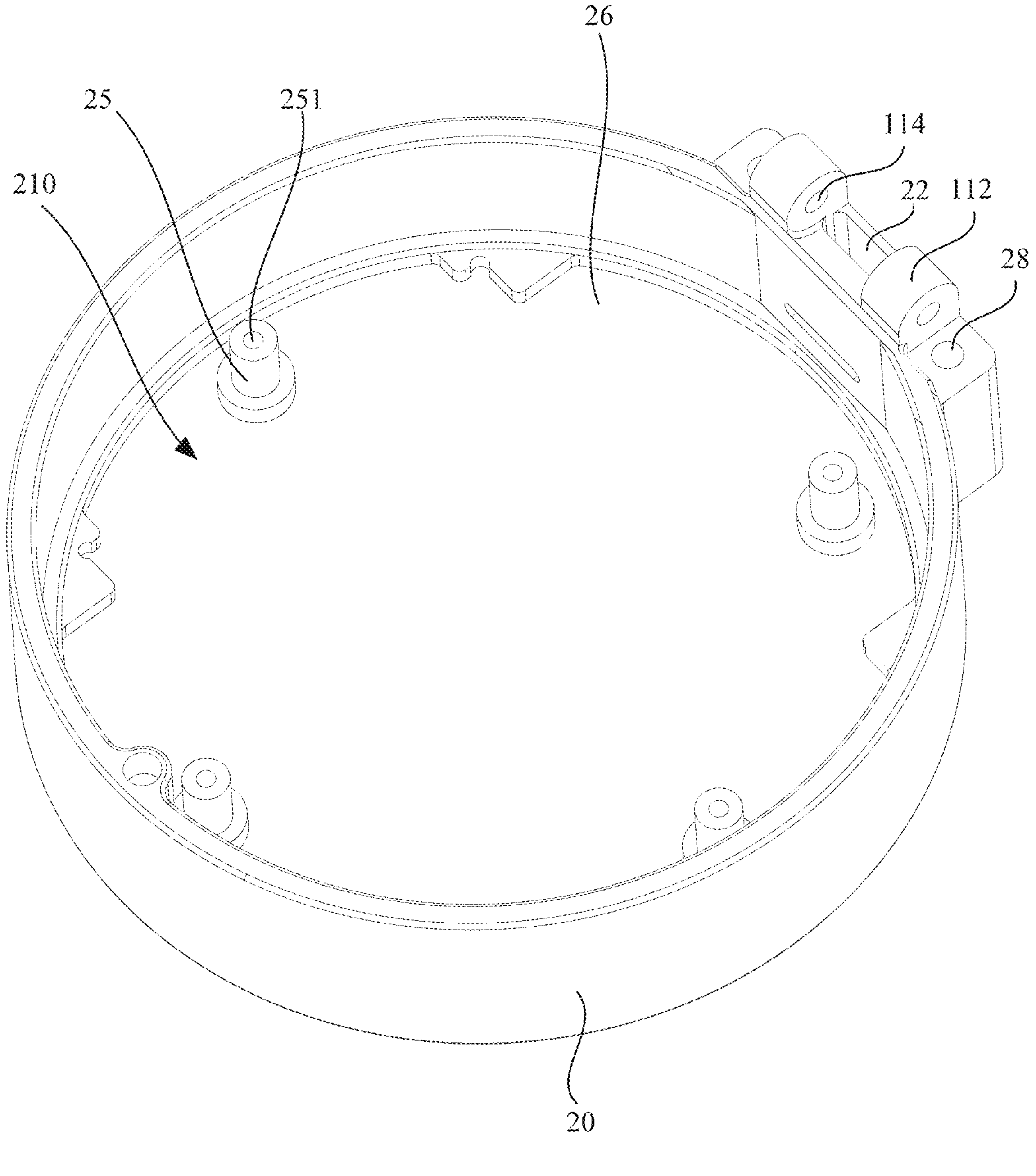
FIG. 4 is a schematic structural diagram of a box base according to some embodiments of the present disclosure.

FIG. 4 is a schematic structural diagram of a box base 20 according to some embodiments of the present disclosure. As shown in FIG. 4, a communicating hole 22 is formed in the box base 20, one end of the communicating hole 22 is disposed on a wall of the accommodating cavity 210, and another end of the communicating hole 22 is disposed at a connection between the box cover 10 and the box base 20. A part of the patch cord 43 is disposed in the communicating hole 22, and another part of the patch cord 43 is disposed in the box cover 10.

By forming the communicating hole 22 in the box base 20 where the box base 20 is connected to the box cover 10, such that the patch cord 43 extending from the box cover 10 can directly enter the communicating hole 22 to be connected to the circuit board 41 in the box base 20, and as few patch cord 43 as possible can be exposed to the external environment to protect the patch cord 43.

Figure 5:
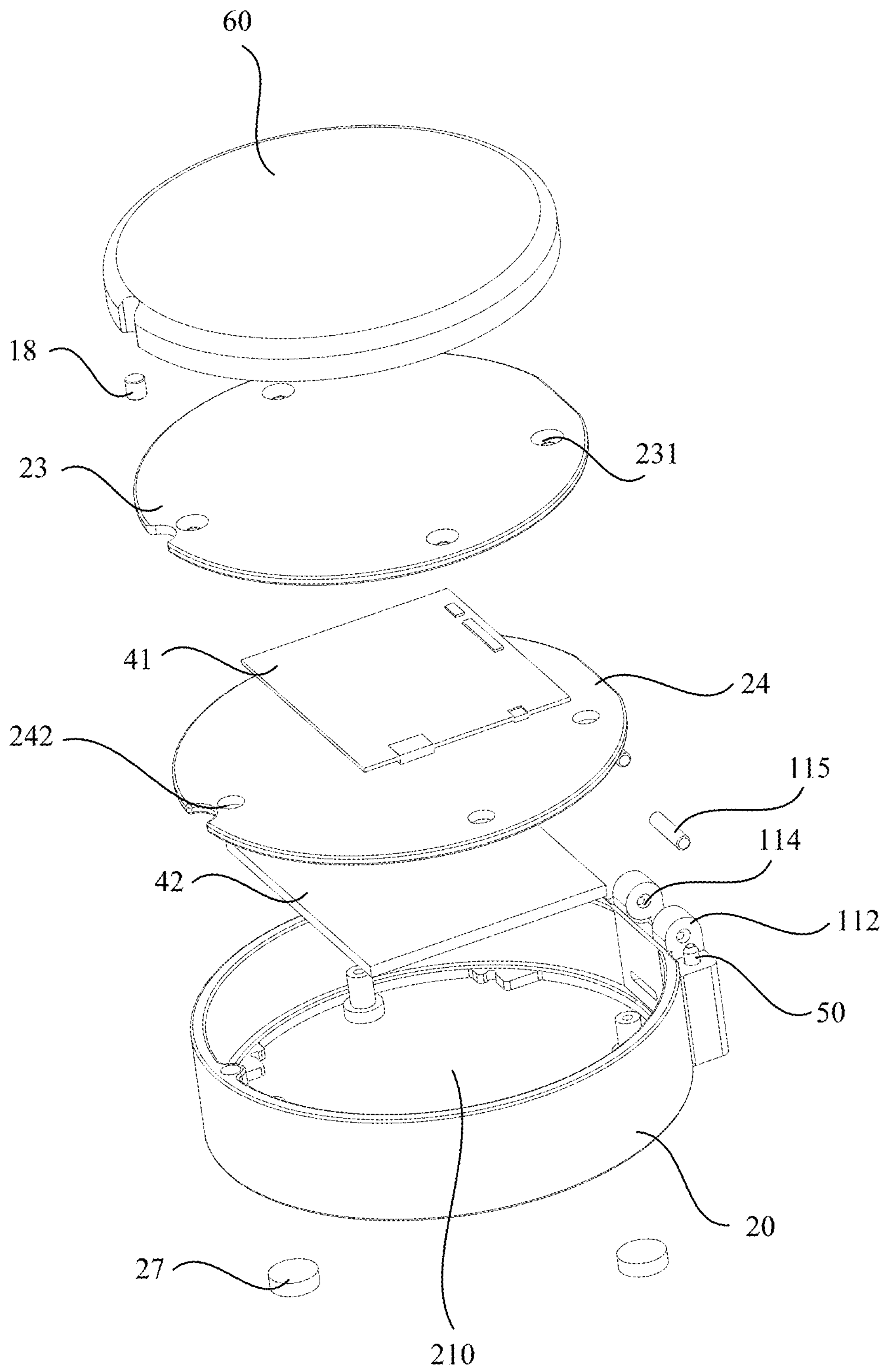
FIG. 5 is an exploded view of a box base according to some embodiments of the present disclosure.

FIG. 5 is an exploded view of a box base according to some embodiments of the present disclosure. As shown in FIG. 5, the box base 20 further includes a partition plate 23.

Figure 6:
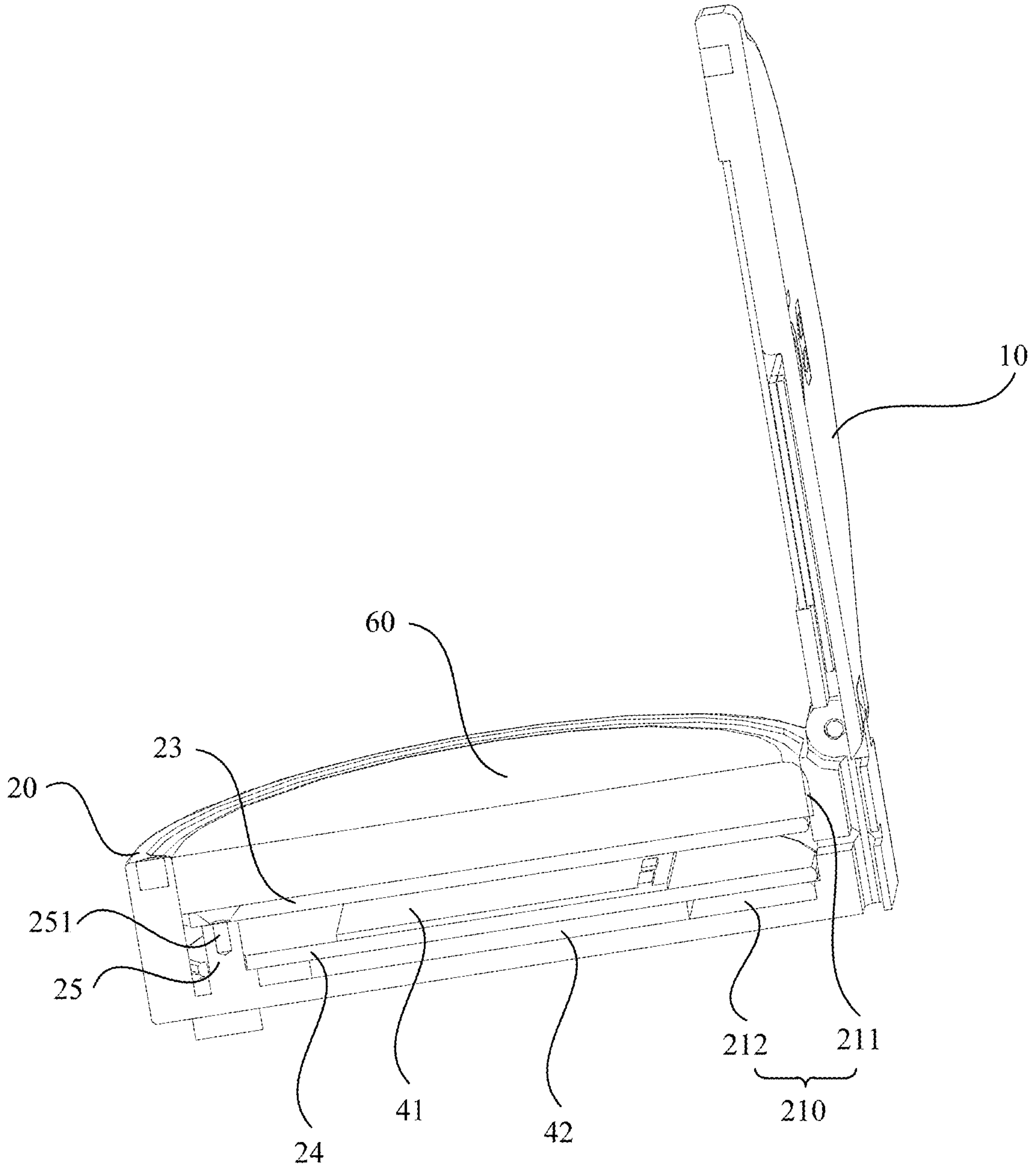
FIG. 6 is a cross-sectional view of AA in FIG. 1.

FIG. 6 is a cross-sectional view of AA in FIG. 1. As shown in FIG. 6, the partition plate 23 divides the accommodating cavity 210 into a first cavity 211 and a second cavity 212. Referring to FIGS. 5 and 6, the first cavity 211 is proximal to the box cover 10, the first cavity 211 is configured to accommodate an article, and the circuit board 41 and the power supply 42 are disposed in the second cavity 212.

The box base 20 is divided into two cavities by the partition plate 23. The first cavity 211 is proximal to the box cover 10 and is an unsealed cavity, and one end of the first cavity 211 towards the box cover 10 is provided with an opening, such that it is convenient to store the article in the first cavity 211 or take the article out of the first cavity 211.

In the embodiments of the present disclosure, the first cavity 211 may be configured to accommodate a cosmetic product, such as a pressed powder 60.

The second cavity 212 formed by dividing the box base 20 by the partition plate 23 is a closed cavity and is configured to store electronic devices such as the circuit board 41, such that the electronic devices such as the circuit board 41 are effectively isolated from the external environment, thereby protecting the electronic devices in the display device.

Optionally, as shown in FIGS. 5 and 6, the display device further includes a power supply 42. The power supply 42 is electrically connected to the circuit board 41 and is disposed in the second cavity 212.

Exemplarily, the power source 42 may be a battery, for example, a lithium battery, a lead battery and another battery having a charging function, and a disposable battery such as a button battery.

As shown in FIGS. 5 and 6, the box base 20 further includes a heat-insulting plate 24. The heat-insulting plate 24 is disposed in the second cavity 212 and disposed between the circuit board 41 and the power supply 42. As shown in FIG. 3, the heat-insulting plate 24 is provided with a connecting groove 241 that runs through the heat-insulting plate 24, and the circuit board 41 and the power supply 42 are electrically connected through the connecting groove 241.

As the power supply 42 is prone to generating heat during supplying power to the mirror display panel 30, to prevent the circuit board 41 placed together with the power supply 42 from damage caused by the heat generated by the power supply 42, the heat-insulting plate 24 is provided in the second cavity 212 to separate the power supply 42 from the circuit board 41, so as to effectively reduce the heat transferred from the power supply 42 to the circuit board 41 and prevent the circuit board 41 from the damage.

Meanwhile, to prevent the electrical connection between the circuit board 41 and the power supply 42 from being affected by the provided heat-insulting plate 24, the connecting groove 241 is formed in the heat-insulting plate 24, and runs through the heat-insulting plate 24, such that the power supply 42 can be electrically connected to the circuit board 41 on another side of the heat-insulting plate 24 through the connecting groove 241.

Exemplarily, the heat-insulting plate 24 is a structural member made of asbestos. Asbestos has an excellent heat-insulting effect, which can effectively reduce the heat transfer from the side where the power supply 42 is disposed on the heat-insulting plate 24 to the side where the circuit board 41 is disposed on the heat-insulting plate 24, and prevent the circuit board 41 from being damaged.

Optionally, as shown in FIGS. 5 and 6, a plurality of supporting columns 25 distributed at intervals are provided in the second cavity 212, and the partition plate 23 is disposed at end faces of the plurality of supporting columns 25 and is detachably connected to the supporting columns 25.

By providing the plurality of supporting columns 25 on the bottom surface of the box base 20 as supporting foundations of the partition plate 23, the partition plate 23 can be disposed in the middle of the accommodating cavity 210, so as to divide the accommodating cavity 210 into two cavities.

As the partition plate 23 is provided on the end faces of the supporting columns 25, the height of the supporting columns 25 is the height of the second cavity 212. In the embodiments of the present disclosure, a ratio of the first cavity 211 to the second cavity 212 may be changed by adjusting the height of the supporting columns 25.

Exemplarily, as shown in FIGS. 5 and 6, four supporting columns 25 distributed at intervals are provided in the second cavity 212.

As shown in FIG. 6, the end face of each supporting column 25 is provided with a screw hole 251, and first through holes 231 are formed in a region of the partition plate 23 corresponding to the supporting columns 25. After the partition plate 23 is placed on the supporting columns 25, the screw holes 251 directly face the corresponding first through holes 231, such that bolts can pass through the first through holes 231 to be screwed with the screw holes 251, thereby fixing the partition plate 23 on the supporting columns 25.

Optionally, as shown in FIG. 5, each first through hole 231 in the partition plate 23 is a counterbore, such that after the bolt is screwed into the screw hole 251, a head of the bolt can be disposed in the counterbore, so as to prevent the head of the bolt from protruding from the partition plate 23 and affecting the placement of the article.

As shown in FIGS. 5 and 6, to prevent the heat-insulting plate 24 from shielding the supporting columns 25, the heat-insulting plate 24 is provided with second through holes 242, the second through holes 242 allows the supporting columns 25 to pass through, such that the end faces of the supporting columns 25 can abut against the partition plate 23.

Optionally, as shown in FIG. 4, a limiting groove 26 is formed on the bottom of the box base 20, and the shape and size of the limiting groove 26 are identical to those of the power supply 42, such that the power supply 42 can be accommodated in the limiting groove 26 to prevent the power supply 42 from loosening.

As shown in FIGS. 5 and 6, a surface of the box base 20 distal from the box cover 10 is provided with cushion blocks 27. The cushion blocks 27 can prevent the box base 20 from being in direct contact with a platform and from abrasion, thereby protecting the box base 20.

The cushion block 27 may be a rubber block, and can provide a frictional force between the box base 20 and the platform, such that after being placed on the platform, the box base 20 is prevented from easily sliding.

Figure 7:
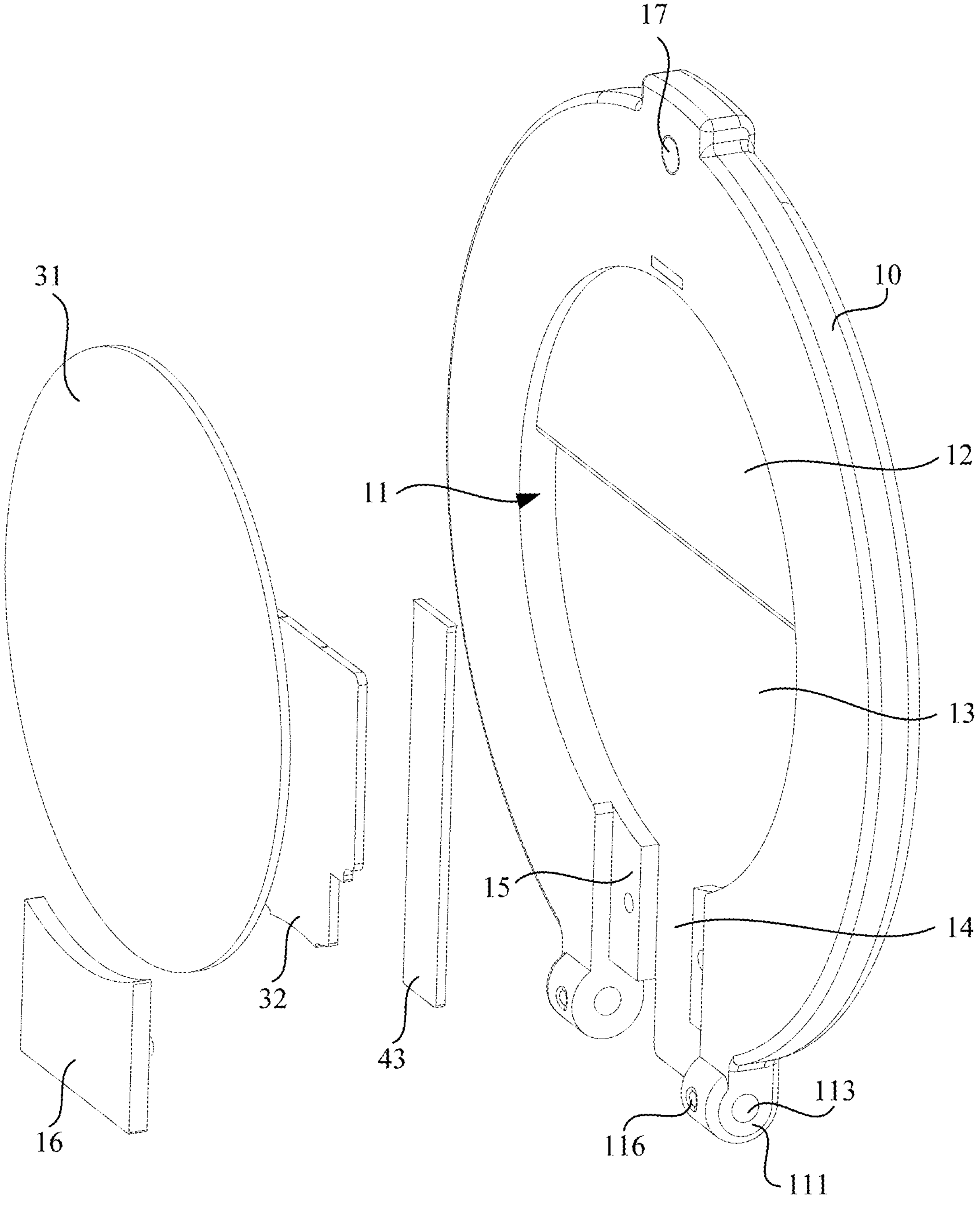
FIG. 7 is an exploded view of a box cover according to some embodiments of the present disclosure.

FIG. 7 is an exploded view of a box cover according to some embodiments of the present disclosure. As shown in FIG. 7, a surface of the box cover 10 facing the box base 20 is provided with an embedding groove 11, and the mirror display panel 30 is disposed in the embedding groove 11.

By forming the embedding groove 11 for accommodating the mirror display panel 30 on the surface of the box cover 10, the mirror display panel 30 may be prevented from protruding from the surface of the box cover 10, thereby protecting the mirror display panel 30. Meanwhile, the purpose of integrated design of the box cover 10 and the mirror display panel 30 is achieved.

Optionally, as shown in FIG. 7, the mirror display panel 30 includes a panel body 31 and a driving integrated circuit 32, and the panel body 31 is electrically connected to the driving integrated circuit 32.

The panel body 31 is a portion for displaying an image in the mirror display panel, and may be an organic light-emitting diode (OLED) display panel. The driving integrated circuit is connected to the panel body, and is configured to control each pixel unit in the panel body to be electrified and to emit light, so as to drive the panel body to display the image. In the embodiments of the present disclosure, the driving integrated circuit may drive the panel body to display the image under the control of the circuit board.

Figure 8:
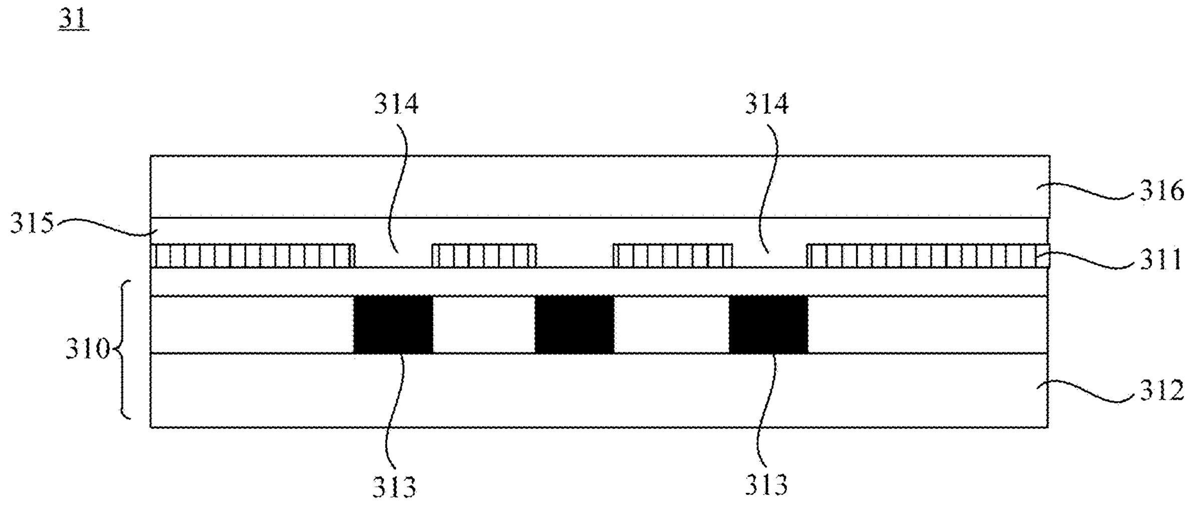
FIG. 8 is a schematic layered diagram of a panel body according to some embodiments of the present disclosure.

FIG. 8 is a schematic layered diagram of a panel body according to some embodiments of the present disclosure. As shown in FIG. 8, the panel body 31 includes a display substrate 310 and a metal reflecting layer 311 which are sequentially stacked.

As shown in FIG. 8, the display substrate 310 includes a base substrate 312 and a plurality of light-emitting units 313, and the plurality of light-emitting units 313 are arranged on the base substrate 312 in an array.

As shown in FIG. 8, the metal reflecting layer 311 is provided with a plurality of light-transmitting holes 314, and each of the light-transmitting holes 314 corresponds to at least one of the light-emitting units 313.

An orthogonal projection of the light-transmitting hole 314 on the base substrate 312 at least partially coincides with an orthogonal projection of the light-emitting unit corresponding to the light-transmitting hole 314 on the base substrate 312.

Optionally, the light-transmitting holes 314 may be in one-to-one correspondence with the light-emitting units, or the light-transmitting hole 314 may also correspond to the plurality of light-emitting units simultaneously, which is not limited in the embodiments of the present disclosure.

In the embodiments of the present disclosure, by forming the light-transmitting holes 314 corresponding to the light-emitting units, the light emitted by the light-emitting units can pass through the metal reflecting layer to achieve the function of displaying the image by the panel body. In addition, the metal reflecting layer may be configured to reflect external ambient light, such that the panel body can be used as a mirror.

Exemplarily, the metal reflecting layer includes an aluminum metal layer or a molybdenum metal layer.

Optionally, as shown in FIG. 8, the panel body 31 further includes a selective reflective layer 315. The selective reflective layer 315 is disposed on a surface of the metal reflecting layer 311 distal from the display substrate 310 and partially disposed in the light-transmitting holes 314. The selective reflective layer 315 includes a composite film layer composed of at least two materials which have different refractive indexes.

The refractive indexes of the at least two different materials in the selective reflective layer are different, such that the composite film layer composed of the at least two materials can select different wavelengths of light entering the composite film layer, thereby enabling the selective reflective layer to reflect light of a set color.

Exemplarily, the selective reflective layer includes a $SiN_x$/$SiO_2$/$SiN_x$ composite film layer.

Optionally, as shown in FIG. 8, the panel body 31 further includes an atomizing layer 316. The atomizing layer 316 is disposed on a surface of the metal reflecting layer 311 distal from the display substrate 310.

By providing the atomizing layer on the display substrate, a screen brightness of the panel body can be reduced, such that the screen brightness is relatively soft, the color is brighter, and an obvious matte effect is achieved.

Exemplarily, the atomizing layer may include an adhesive material and scattering particles; and the scattering particles are dispersed in the adhesive material, or are coated on a side of the adhesive material distal from the base substrate.

An adhesive material monomer is doped with particles having a scattering function, such that part of the light can be scattered, thereby achieving an atomizing effect.

Exemplarily, the adhesive material is a triacetate fiber material; and the scattering particles are made of an acrylic material or silicon dioxide.

Exemplarily, the scattering particles are spherical, and the diameters of the scattering particles are 2 μm to 9 μm.

Exemplarily, the atomizing layer contains at least two types of scattering particles having different diameters.

The scattering particles made of the acrylic or silicon dioxide material are dispersed into the adhesive material monomer to form an optical film layer, such that micron-level concave-convex surfaces can be formed in the optical film layer. These concave-convex surfaces can refract incident light and play the role of light diffusion. In addition, as the function of the spherical scattering particle is similar to that of a convex lens, in the case that light passes through these particles, the light is focused to an exit angle. Thus, a function of ensuring the brightness can be achieved. Moreover, the scattering particles with different sizes also ensure that light cannot be directly emitted from the diffusing film, thereby further playing the role of atomization. In addition, a haze may be controlled by controlling the concentration of the scattering particles. The more scattering particles are, the more dispersed the scattered light is, and the greater the haze is.

Optionally, the haze of the atomizing layer is 20% to 30%. By setting the haze of the atomizing layer within the above range, it avoids the adverse influence on a clarity of the display effect caused by an increased diffuse reflectance arising from a too large haze, and moreover, it avoids a reduced matte feeling of the panel body caused by an insufficient diffuse reflectance extent arising from a too small haze of the atomizing layer.

The haze refers to a cloudy or turbid appearance in the interior or on the surface of a transparent or semi-transparent material caused by light diffusion, and is expressed as a percentage of a ratio of a flux of diffused light to a flux of light passing through the material. Specifically, in the case that a beam of parallel light from a standard "c" light source is vertically incident on a transparent or semi-transparent film, sheet and plate, some parallel light deviates from the incident direction due to scattering inside and on the surface of the material; and the haze, that is, the percentage of the ratio of the flux Td of scattered light which deviates from the incident direction by more than 2.5 degrees to the flux T2 of the light passing through the material, is an important parameter of optical transparency of the transparent or semi-transparent material.

Exemplarily, the haze of the atomizing layer is 25%.

As shown in FIG. 7, a mounting table 12 is disposed in the mounting groove 11. A part of the panel body 31 is disposed on the mounting table 12, and another part of the panel body 31, the mounting table 12, and the bottom of the mounting groove 11 are enclosed to form a mounting cavity 13, and the driving integrated circuit 32 is disposed in the mounting cavity 13.

In the embodiments of the present disclosure, the mounting table 12 is a platform extending from a wall of the embedding groove 11 to a center of the embedding groove 11, and a surface of the mounting table 12 towards the panel body 31 is flat, such that the mounting table 12 can be conveniently adhered to the display panel to support the panel body 31.

The thickness of the mounting table 12 is not greater than the depth of the embedding groove 11, and a difference between the thickness of the mounting table 12 and the depth of the embedding groove 11 may be not less than the thickness of the panel body 31, such that the mirror display panel 30 is prevented from protruding from the surface of the box cover 10 after the panel body 31 is mounted on the mounting table 12, thereby protecting the mirror display panel 30.

In addition, the thickness of the mounting table 12 is not less than that of the driving integrated circuit 32. In this way, it ensures that the driving integrated circuit 32, after being placed in the mounting cavity 13, is prevented from protruding from the mounting table 12 and affecting the mounting of the panel body 31.

Optionally, as shown in FIG. 7, the box cover 10 is provided with a channel 14. The channel 14 is disposed at a connection between the box cover 10 and the box base 20, and is communicated with the mounting cavity 13; and the patch cord 43 is disposed in the channel 14 and is connected to the driving integrated circuit 32.

The channel 14 extends from the outer surface of the box cover 10 to the embedding groove 11 inside the box cover 10, is communicated with the mounting cavity 13, and is configured to enable the patch cord 43 to pass through, such that the patch cord 43 can enter the mounting cavity 13 through the channel 14 and can be connected to the driving integrated circuit 32 in the mounting cavity 13.

Optionally, as shown in FIG. 7, a checking groove 15 communicated with the channel 14 is formed in a region on a surface of the box cover 10 corresponding to the channel 14, and a checking plate 16 is mounted in the checking groove 15, and is detachably connected to the checking groove 15.

Before mounting the patch cord 43, the checking plate 16 may be removed from the checking groove 15, which is convenient for wiring. After the mounting of the patch cord 43 is completed, the checking plate 16 is mounted into the checking groove 15 again to cover the patch cord 43, such that the patch cord 43 is prevented from being exposed to the external environment.

In some embodiments of the present disclosure, the box cover 10 is hinged with the box base 20. That is, the box cover 10 can rotate around a hinge point as a center on the box base 20.

In the embodiments of the present disclosure, during a process that the box cover 10 rotates relative to the box base 20, in the case that the surface of the box cover 10 on which the mirror display panel 30 is mounted rotates to adhere to the surface of the box base 20, the box cover 10 is in the closed state in this case, and the mirror display panel 30 is disposed inside the box base 20.

In the embodiments of the present disclosure, during the process that the box cover 10 rotates relative to the box base 20, in the case that the surface of the box cover 10 on which the mirror display panel 30 is mounted rotates to have a non-zero included angle with the surface of the box base 20, for example, the included angle between the mirror display panel 30 and the surface of the box base 20 is more than 70 degrees, the box cover 10 is in the open state in this case, and the mirror display panel 30 is disposed outside the box base 20, such that the mirror display panel 30 is exposed for a user to use.

Figure 9:
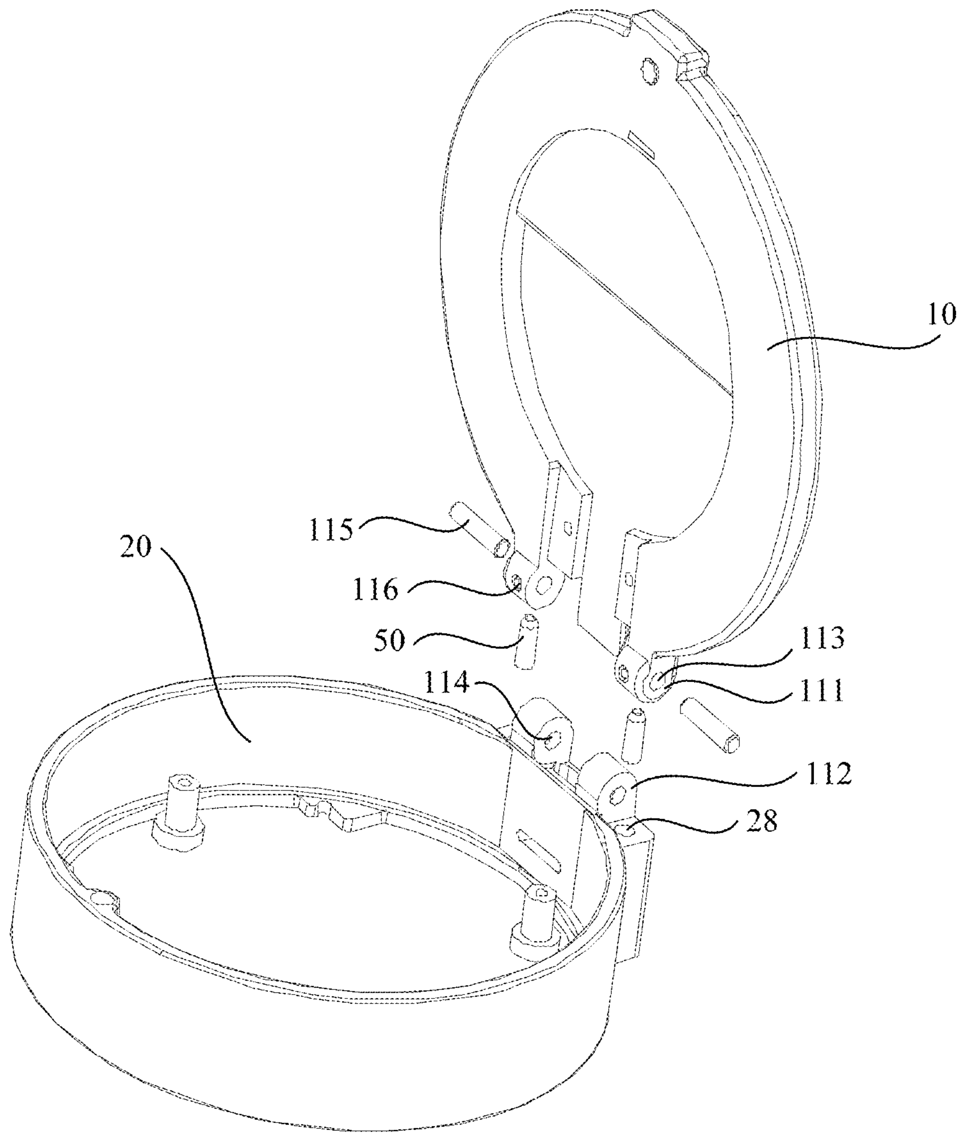
FIG. 9 is a schematic assembling diagram of a box cover and a box base according to some embodiments of the present disclosure.

FIG. 9 is a schematic assembling diagram of a box cover 10 and a box base 20 according to some embodiments of the present disclosure. As shown in FIG. 9, the box cover 10 is provided with first lug plates 111, and a first hinge hole 113 is formed in each first lug plate 111. The box base 20 is provided with second lug plates 112, and a second hinge hole 114 is formed in each second lug plate 111. The first lug plates 111 and the second lug plates 112 are parallel, the first hinge holes 113 and the second hinge holes 114 are coaxial, and the first lug plates 111 and the second lug plates 114 are hinged through a pin shaft 115 in the first hinge holes 113 and in the second hinge holes 114.

By arranging the first lug plates 111 on the box cover 10 and the second lug plates 112 on the box base 20, in the case that the box cover 10 is connected to the box base 20, the first lug plates 111 and the second lug plates 112 are parallel and aligned, and the first hinge holes 113 of the first lug plates 111 and the second hinge holes 114 of the second lug plates 112 are coaxial, such that the pin shaft 115 can simultaneously pass through the first hinge holes 113 and the second hinge holes 114. In this way, the box cover 10 can rotate, relative to the box base 20, around the pin shaft 115 as a center axis, thereby enabling the box cover 10 and the box base 20 to be hinged.

Exemplarily, as shown in FIG. 9, the box cover 10 has two first lug plates 111, and the box base 20 has two second lug plates 112 corresponding to the two first lug plates 111. By providing the plurality of first lug plates 111 and the plurality of second lug plates 112 which cooperate with each other, the box cover 10 and the box base 20 are hinged, such that the hinge reliability of the box cover 10 and the box base 20 can be improved.

Optionally, the display device further includes a lock-up member. The lock-up member is disposed on the box base 20 and is configured to lock a relative angle between the box cover 10 and the box base 20.

By providing the lock-up member to fix the relative angle between the box cover 10 and the box base 20, the box cover 10 and the box base 20 can keep an angle required by the user, such that the user does not need to manually support the box cover 10 and the box base 20, facilitating the use by the user.

Figure 10:
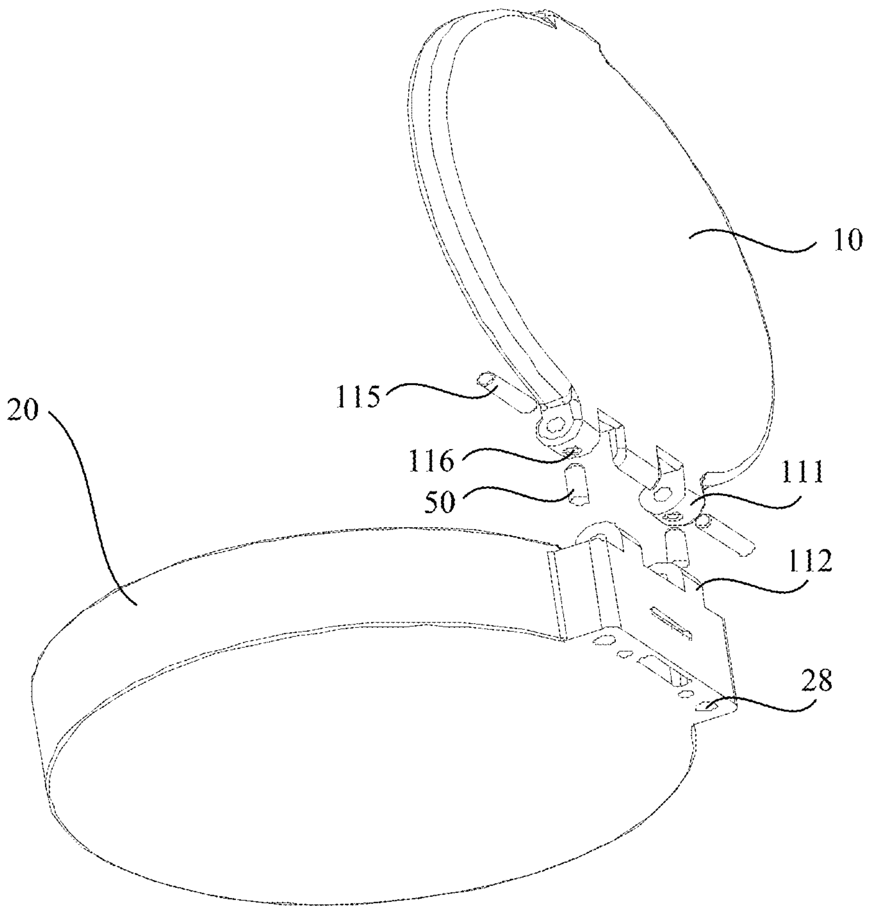
FIG. 10 is a schematic assembling diagram of a box cover and a box base according to some embodiments of the present disclosure.

FIG. 10 is a schematic assembling diagram of a box cover 10 and a box base 20 according to some embodiments of the present disclosure. As shown in FIGS. 9 and 10, the box cover 10 is hinged with the box base 20, and the box cover 10 is provided with an arc-shaped surface facing the box base 20. The arc-shaped surface is disposed at a hinge between the box cover 10 and the box base 20, and is centered around a hinge axis between the box cover 10 and the box base 20, and is provided with at least two lock-up grooves 116, the at least two lock-up grooves 116 are arranged circumferentially at intervals by taking the hinge axis between the box cover 10 and the box base 20 as a center.

Exemplarily, as shown in FIGS. 9 and 10, the arc-shaped surface of the box cover 10 is disposed on the first lug plates 111.

The lock-up member includes a wave bead screw 50, and a bead 53 of the wave bead screw 50 faces the arc-shaped surface and abuts against the arc-shaped surface.

Figure 11:
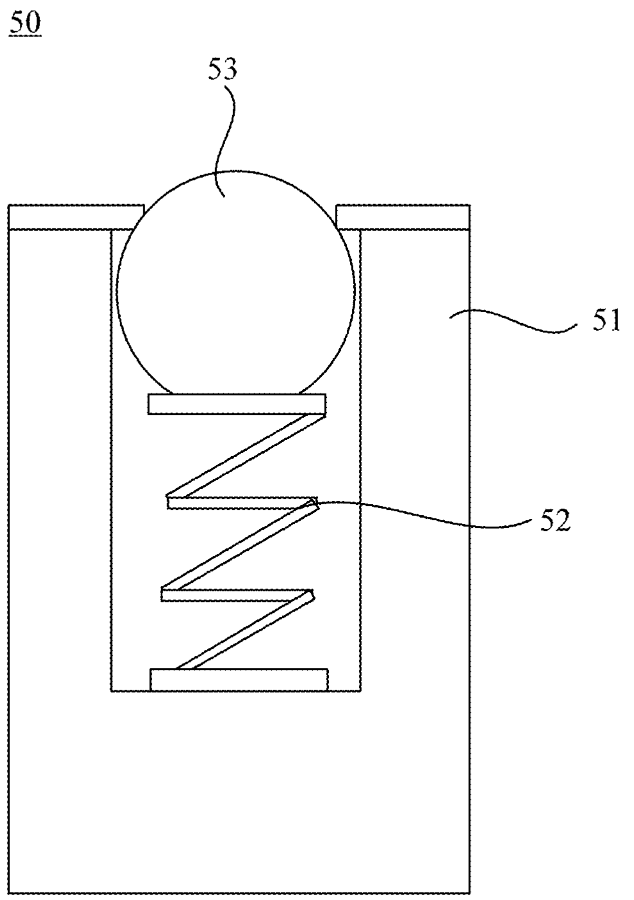
FIG. 11 is a cross-sectional view of a wave bead screw according to some embodiments of the present disclosure.

FIG. 11 is a cross-sectional view of a wave bead screw according to some embodiments of the present disclosure. As shown in FIG. 11, the wave bead screw 50 includes a barrel 51, a spring 52, and a bead 53. One end of the barrel 51 is an opening end, and the spring 52 and the bead 53 are disposed in the barrel 51. Moreover, the bead 53 is disposed between the opening end and the spring 52, and the opening diameter of the open end is smaller than that of the bead 53.

A partial region of the bead 53 in which the size is smaller than an opening diameter of the opening end is disposed outside the cylinder 51. In the case that the external force is applied onto the bead 53, the spring 52 is squeezed by the bead 53, and the bead 53 is withdrawn into the cylinder 51; and in the case that the external force disappears, the bead 53 returns to the opening end under an elastic force of the spring 52.

In the embodiments of the present disclosure, referring to FIGS. 9 and 10, the arc-shaped surface of each first lug plate 111 is a circular arc surface, and the circular arc surface is provided with two lock-up grooves 116. As the bead 53 of the wave bead screw 50 abuts against the arc-shaped surface, the bead 53 is withdrawn into the cylinder 51 under the squeezing of the arc-shaped surface. During a rotating process of the first lug plate 111, in the case that the lock-up grooves 116 on the arc-shaped surface face the bead 53, the external force exerted by the arc-shaped surface on the bead 53 is instantly released, and the bead 53 returns to the opening end under the elastic force of the spring 52; and in addition, a portion having a smaller size on the bead 53 enters into the lock-up grooves 116, such that the continuous rotation of the first lug plate 111 is restricted, thereby fixing the relative positions of the box cover 10 and the box base 20.

As shown in FIGS. 9 and 10, the arc-shaped surface of the first lug plate 111 is provided with two lock-up grooves 116. One of the lock-up grooves 116 is configured to lock the first lug plate 111 up in the case that the box cover 10 is in the open state, and the other lock-up groove 116 is configured to lock the first lug plate 111 up in the case that the box cover 10 is in the closed state.

Exemplarily, an interval distribution angle between the two lock-up grooves 116 is 90 degrees, such that after the box cover 10 is opened, the box cover 10 and the box base 20 can be just in a vertical state, which is convenient for the user to use.

It should be noted that the interval distribution angle between the two lock-up grooves 116 may be any other angle, and a specific angle may be determined according to a use requirement of the user, which is not limited in the embodiments of the present disclosure.

As shown in FIGS. 9 and 10, the lock-up member includes two wave bead screws 50. By providing the two wave bead screws 50, the reliability of locking the relative angle between the box cover 10 and the box base 20 by the lock-up member can be improved.

A third through hole 28 for mounting the corresponding wave bead screw 50 may be formed in the box base 20, a part of the wave bead screw 50 is inserted into the third through hole 28, and another part of the wave bead screw 50 is disposed outside the third through hole 28, such that the bead 53 of the wave bead screw 50 can bounce into the lock-up groove 116 of the corresponding first lug plate 111.

In other embodiments, the lock-up member may be a latch. After the box cover 10 is rotated to a proper position, the latch may be simultaneously inserted in the first lug plate 111 and the second lug plate 112, such that the first lug plate 111 and the second lug plate 112 are locked, thereby fixing the relative angle between the box cover 10 and the box base 20.

In other embodiments, the lock-up member may also be a bracket. After the box cover 10 is rotated to a proper position, the box cover 10 may be supported by the bracket to maintain the relative angle between the box cover 10 and the box base 20.

For example, the bracket may be a supporting plate disposed on a surface of the box cover 10 distal from the box base 20. One side edge of the supporting plate is connected to the box cover, and the other side edge of the supporting plate may abut against the platform on which the box base is placed in the case that the box cover is opened, thereby maintaining the relative angle between the box cover 10 and the box base 20.

Optionally, as shown in FIG. 1, the display device further includes a first locking structure 17 and a second locking structure 18. The first locking structure 17 is disposed on the surface of the box cover 10 facing the box base 20, and the second locking structure 18 is disposed on the surface of the box base 20 facing the box cover 10. In the case that the box cover 10 is in the closed state, the first locking structure 17 and the second locking structure 18 are connected in a lock-up fashion.

In the case that the box cover 10 is in the closed state, the first locking structure 17 and the second locking structure 18 can be connected in a lock-up fashion, so as to keep the box cover 10 and the box base 20 in the closed state. Thus, it is difficult to open the box cover 10, and the article in the box base 20 is protected from being lost.

Exemplarily, as shown in FIG. 1, the first locking structure 17 and the second locking structure 18 are both magnetic members.

The first locking structure 17 and the second locking structure 18 are both magnetic members, and the surface of the box cover 10 facing the box base 20 is provided with a circular hole for mounting the first locking structure 17, and a surface of the box base 20 facing the box cover 10 is provided with a circular hole for mounting the second locking structure 18. In the case that the box cover 10 is in the closed state, the first locking structure 17 and the second locking structure 18 face each other, such that the first locking structure 17 and the second locking structure 18 can be attracted together.

Exemplarily, one of the first locking structure 17 and the second locking structure 18 is a protrusion, the other of the first locking structure 17 and the second locking structure 18 is a recess, and the protrusion is detachably connected to the recess.

For example, the first locking structure 17 is the protrusion and the second locking structure 18 is the recess. In the case that the box cover 10 is in the closed state, the protrusion is just inserted into the recess. By the matching of the protrusion with the recess in an inserting fashion, the box cover 10 is prevented from being easily separated from the box base 20, thereby keeping the box cover 10 and the box base 20 in a connected state.

In some embodiments, in addition to the connection by the hinge, the box cover 10 and the box base 20 may also be connected by a flexible member.

Exemplarily, the box cover 10 and the box base 20 are connected by a flexible connecting belt, one part of which is connected to the box cover 10 and the other part of which is connected to the box base 20.

The flexible connecting belt may be a flexible and bendable belt, and for example, may be a rubber belt or a plastic belt.

In the embodiments of the present disclosure, the display device is a cosmetic mirror. The mirror display panel 30 in the display device not only can be used as a mirror capable of reflecting light on the panel to image, but also can display information to help the user make up.

Exemplarily, the mirror display panel 30 is configured to display environmental parameters, and the environmental parameters include an ultraviolet index and a humidity.

The display device further includes a communication module which may be a wireless communication module. The communication module may transmit data with a cloud server, such that the mirror display panel can obtain the environmental parameters from the cloud server through the communication module.

In this way, the user may better choose sunscreen products based on the ultraviolet index, and may also choose other cosmetics based on the humidity, facilitating the use.

Optionally, the mirror display panel 30 is configured to display makeup information in a set region. The makeup information includes a makeup color and a makeup map, and the set region includes at least a part of a region where a human face is imaged on the mirror display panel 30.

In the above embodiment, the display device may further include a controlling unit and an image acquiring unit. The controlling unit is connected to the image acquiring unit and the mirror display panel 30.

The image acquiring unit is disposed on the box cover 10 and on the same surface of the box cover 10 as the mirror display panel 30.

The image acquiring unit is configured to acquire portrait data of a user and send the portrait data to the controlling unit. The image acquiring unit may accurately acquire information of a face of a user through face recognition technology.

The controlling unit can control the mirror display panel 30 to display cosmetic information for the user to select a cosmetic. Meanwhile, the controlling unit can also acquire the cosmetic selected by the user and determine a part on the face of the user to which the selected cosmetic is specifically applied based on the type of the cosmetic selected by the user.

For example, the controlling unit may determine the cosmetic selected by the user based on touch information of the mirror display panel, and a corresponding relationship between the types of cosmetics and positions is prestored in the controlling unit. After acquiring that the cosmetic selected by the user is a lipstick, the controlling unit determines that a position corresponding to the cosmetic is the mouth according to the corresponding relationship and the type of the cosmetic.

In addition, the controlling unit can also receive the portrait data acquired by the image acquiring unit, and generate information at least including coordinates and dimensions of specific positions of facial features, and determine an image coverage position through the acquired specific coordinates.

For example, after acquiring the specific position (mouth) and analyzing the specific coordinates of the mouth based on the acquired portrait data, the controlling unit determines a specific region where the lipstick is required to be displayed on the mirror display panel, namely, determining the set region.

Then, the makeup information is retrieved from a storage unit, and makeup information of different cosmetics is different. After determining the makeup information, the controlling unit displays the corresponding makeup information, for example, displays the red color on the mirror display panel 30. That is, a covered image formed after the selected cosmetic is applied is displayed at a face imaging position on the mirror display panel 30.

Exemplarily, the image acquiring unit is a camera.

The foregoing is not intended to limit the present disclosure in any form. Although the present disclosure has been disclosed as above by the embodiments, the embodiments are not intended to limit the present disclosure. Any those familiar with this art can make some amendments or modifications to these embodiments by using the technical content disclosed above without departing from the scope of the technical solutions of the present disclosure to acquire equivalent embodiments of equivalent changes. In addition, any simple modifications, equivalent changes, and modifications made to the above embodiments according to the technical essence of the present disclosure without departing from the content of the technical solutions of the present disclosure are still within the scope of the technical solutions of the present disclosure.

What is claimed is:

1. A display device, comprising: a box cover, a box base, a circuit board and a patch cord and a mirror display panel, wherein the box cover is connected to the box base, and the mirror display panel is connected to the box cover;

the box cover is configured to have an open state and a closed state, wherein in a case that the box cover is in the open state, the box cover is at least partially separated from the box base, such that the mirror display panel is disposed outside the box base; and in a case that the box cover is in the closed state, the mirror display panel is disposed inside the box base;

wherein a surface of the box cover facing the box base is provided with an embedding groove, and the mirror display panel is disposed in the embedding groove;

wherein the mirror display panel comprises a panel body and a driving integrated circuit, and the panel body is electrically connected to the driving integrated circuit; and wherein a mounting table is provided in the embedding groove, a part of the panel body is disposed on the mounting table, another part of the panel body, the mounting table, and a bottom of the embedding groove are enclosed to form a mounting cavity, and the driving integrated circuit is disposed in the mounting cavity; and wherein the box cover is provided with a channel, wherein the channel is disposed at a connection between the box cover and the box base, and is communicated with the mounting cavity, and the patch cord is disposed in the channel and is connected to the driving integrated circuit.

2. The display device according to claim 1, wherein the box base is provided with an accommodating cavity, the circuit board is disposed in the accommodating cavity, and the circuit board and the mirror display panel are connected by the patch cord.

3. The display device according to claim 2, wherein the box base further comprises a partition plate, wherein the partition plate divides the accommodating cavity into a first cavity and a second cavity, the first cavity being proximal to the box cover and being configured to accommodate an article, and the circuit board being disposed in the second cavity.

4. The display device according to claim 3, further comprising a power supply, wherein the power supply is electrically connected to the circuit board and is disposed in the second cavity; and the box base further comprises a heat-insulating plate, wherein the heat-insulating plate is disposed in the second cavity and is disposed between the circuit board and the power supply.

5. The display device according to claim 2, wherein the box base is provided with a communicating hole, wherein one end of the communicating hole is disposed on a wall of the accommodating cavity, and another end of the communicating hole is disposed at a connection between the box cover and the box base; and a part of the patch cord is disposed in the communicating hole, and another part of the patch cord is disposed in the box cover.

6. The display device according to claim 1, wherein the panel body comprises a display substrate and a metal reflecting layer which are sequentially stacked;

wherein the display substrate comprises a base substrate and a plurality of light-emitting units, the plurality of light-emitting units being arranged on the base substrate in an array; and the metal reflecting layer is provided with a plurality of light-transmitting holes, and each of the light-transmitting holes corresponding to at least one of the light-emitting units.

7. The display device according to claim 6, wherein the metal reflecting layer comprises an aluminum metal layer or a molybdenum metal layer.

8. The display device according to claim 6, wherein the panel body further comprises a selective reflective layer, wherein the selective reflective layer is disposed on a surface of the metal reflecting layer distal from the display substrate and partially disposed in the light-transmitting holes, and the selective reflective layer comprises a composite film layer composed of at least two materials which have different refractive indexes.

9. The display device according to claim 8, wherein the selective reflective layer comprises a $SiNx/SiO_2/SiNx$ composite film layer.

10. The display device according to claim 6, wherein the panel body further comprises an atomizing layer, wherein the atomizing layer is disposed on a surface of the metal reflecting layer distal from the display substrate.

11. The display device according to claim 1, wherein the box cover is hinged with the box base, or the box cover is connected to the box base by a flexible member.

12. The display device according to claim 1, further comprising a lock-up member, wherein the lock-up member is disposed on the box base and is configured to lock a relative angle between the box cover and the box base.

13. The display device according to claim 12, wherein the box cover is hinged with the box base;

the box cover is provided with an arc-shaped surface, wherein the arc-shaped surface is disposed at a hinge between the box cover and the box base, is centered around a hinge axis between the box cover and the box base, and is provided with at least two lock-up grooves, the two lock-up grooves being arranged circumferentially at intervals by taking the hinge axis as a center; and the lock-up member comprises a wave bead screw, wherein a bead of the wave bead screw abuts against the arc-shaped surface.

14. The display device according to claim 1, further comprising a first locking structure and a second locking structure, wherein the first locking structure is disposed on a surface of the box cover facing the box base, the second locking structure is disposed on a surface of the box base facing the box cover, and in the case that the box cover is in the closed state, the first locking structure and the second locking structure are connected in a lock-up fashion.

15. The display device according to claim 14, wherein the first locking structure and the second locking structure are both magnetic members; or, one of the first locking structure and the second locking structure is a protrusion, another of the first locking structure and the second locking structure is a recess, the protrusion being detachably connected to the recess.

16. The display device according to claim 1, wherein the display device is a cosmetic mirror.

17. The display device according to claim 16, wherein the mirror display panel is configured to display environmental parameters, the environmental parameters comprising an ultraviolet index and a humidity; or, the mirror display panel is configured to display makeup information in a set region, wherein the makeup information comprises a makeup color and a makeup map, and the set region comprises at least a part of a region where a human face is imaged on the mirror display panel.

* * * * *